United States Patent [19]

Ichikawa et al.

[11] Patent Number: 4,958,504
[45] Date of Patent: Sep. 25, 1990

[54] AIR CONDITIONING APPARATUS FOR USE IN AUTOMOBILE

[75] Inventors: Toru Ichikawa, Kusatsu; Hideo Nishihata; Nobuo Kagoroku, both of Otsu; Shotarou Ito, Shiga, all of Japan

[73] Assignee: Matsushita Electric Industrial Co., Ltd., Osaka, Japan

[21] Appl. No.: 368,997

[22] Filed: Jun. 16, 1989

[30] Foreign Application Priority Data

Jun. 17, 1988 [JP] Japan .................. 63-150726

[51] Int. Cl.⁵ .............................. B60H 1/32
[52] U.S. Cl. .................... 62/244; 62/259.1; 62/426; 165/122; 415/53.1; 98/2.11
[58] Field of Search ............. 62/DIG. 10, 426, 419, 62/244, 259.1; 98/2.11; 415/53.1, 53.3; 165/122

[56] References Cited

U.S. PATENT DOCUMENTS

| | | | |
|---|---|---|---|
| 3,033,441 | 5/1962 | Coester | 415/53.1 |
| 3,211,077 | 12/1965 | Kramer, Jr. | 165/122 X |
| 3,255,957 | 6/1966 | Laing | 415/53.1 |
| 3,303,666 | 2/1967 | Toper | 62/426 |
| 4,279,569 | 7/1981 | Harloff | 415/53.1 |
| 4,458,502 | 7/1984 | Adachi et al. | 62/DIG. 16 |

FOREIGN PATENT DOCUMENTS 76833 4/1986 Japan .................. 165/122

Primary Examiner—William E. Tapolcai
Attorney, Agent, or Firm—Wenderoth, Lind & Ponack

[57] ABSTRACT

The present invention provides an air conditioning apparatus for use in an automobile which employs a cross-flow fan as a ventilator, so that the apparatus is made thinner. The apparatus of the present invention is provided with a first and a second stabilizer, and accordingly a compulsory vortex of the air which is effective to feed the air is able to be stabilized. Moreover, a rear guider and an upper diffuser are provided in the surface opposite to the stabilizers with respect to the cross-flow fan, with enhancing the stabilization of the air flow. The reduction of the air flow amount and/or the generation of noises because of the vortex of the air can be consequently prevented. In the automobile air conditioning apparatus of the present invention, an evaporator has its upper end arranged to be inclined towards the cross-flow fan, so that the air flow into the cross-flow fan runs smoothly. Because of the arrangement of the above-described first and second stabilizers and the cross-flow fan, according to the present invention, the compulsory vortex of the air is generated at the optimum position and positively, thereby to make it possible to secure sufficient air amount and also to reduce noises, while realizing smooth and continuous flow of the air inside the room of the automobile.

7 Claims, 7 Drawing Sheets

AIR CONDITIONING APPARATUS FOR USE IN AUTOMOBILE

BACKGROUND OF THE INVENTION

1. Field of the Invention

The present invention relates to an air conditioning apparatus for use in an automobile and more particularly, to an air conditioning apparatus for use in an automobile which is placed in the under surface of a ceiling of the automobile.

2. Description of Related Art

Heretofore, in some conventional air conditioning apparatuses of the type referred to above for use in an automobile, a centrifugal fan has been employed for a ventilator as disclosed in Japanese Laid-open Utility Model Applications Nos. 63-22213 and 63-24011.

In the above-described case where the centrifugal fan has been utilized as a ventilator, however, there have been limits to which the thickness of the air conditioning apparatus can be reduced in a heightwise direction thereof. In other words, the centrifugal fan is of such construction that the air is sucked from an end surface vertical to a rotary shaft thereof and blown out from an outer periphery by the use of the centrifugal force, and consequently it is difficult to make the diameter of the fan small. Accordingly, in the case where the centrifugal fan has its rotary shaft arranged to be horizontal (as disclosed in Japanese Laid-open Utility Model Application No. 63-22213), it becomes necessary to provide sufficient height for the diameter of the fan and also for a fan casing covering the fan.

Generally, the optimum width of the centrifugal fan in the direction of the rotary shaft is equal to the radius of the fan. Therefore, even in the case where the fan has its rotary shaft arranged to be vertical (as disclosed in Japanese Laid-open Utility Model Application No. 63-24011), it is necessary to provide a height relative to the diameter of the fan, and at the same time, it is required to provide a motor in the direction of the rotary shaft for driving the fan.

In the meantime, since the ceiling of the automobile is restricted to a predetermined height by such reasons as the air resistance, the safety of the automobile body, etc., it is a vital problem to reduce the thickness of the air conditioning apparatus in the heightwise direction.

SUMMARY OF THE INVENTION

An essential object of the present invention is to provide an improved air conditioning apparatus for use in an automobile which employs a cross-flow fan (reflux fan) as a ventilator, thereby to reduce the thickness of the apparatus.

Another object of the present invention is to provide an improved air conditioning apparatus for use in an automobile of the type referred to above whereby the air flow runs in the most suitable manner when the cross-flow fan is used, and securing sufficient air quantity and reducing noises.

A further object of the present invention is to provide an improved air conditioning apparatus for use in an automobile of the type referred to above which can achieve improvement of the air conditioning efficiency when mounted in an automobile, resulting in improvement of the amenity.

In accomplishing the above-described objects of the present invention, the automobile air conditioning apparatus is comprised of an upper casing and a lower casing. The upper casing includes a cross-flow fan having a rotary shaft thereof arranged in a horizontal direction, which receives the air from one side in an outer periphery of an impeller and discharges the air, after the air has passed through within the impeller, out of the other side of the impeller, a rear guider in the form of a curved surface having the center of the radius of curvature at the side of said cross-flow fan, and an upper diffuser continued from said rear guider and extended in a direction far away from said cross-flow fan from on the extension line of said rear guider. The above-described cross-flow fan, rear guider and upper diffuser are provided in the upper casing in the lower surface at the side of a discharge port in the order from the cross-flow fan. On the other hand, the lower casing includes a lower diffuser forming, together with the upper diffuser, a discharge section which is gradually enlarged, a first stabilizer provided with the lower diffuser, a second stabilizer placed in the upper stream side from the first stabilizer, and a recessed portion formed between the first and second stabilizers.

In the automobile air conditioning apparatus according to the present invention, a suction port is formed in the rear surface of the apparatus, while a discharge port is formed in the front surface of the apparatus. From the rear within the apparatus, there are provided an evaporator having an upper end thereof inclined frontward, the cross-flow fan having a rotary shaft arranged in a widthwise direction of the apparatus, the rear guider in the form of a curved surface in the upper part forward of the cross-flow fan, the upper diffuser continued from the rear guider, extended to the discharge port and provided in the upper part forward of the cross-flow fan. Moreover, below the cross-flow fan inside the apparatus, the first stabilizer is provided forward of a vertical surface passing the axial center of the cross-flow fan, and the second stabilizer is provided rearward of the vertical surface.

In the above-described apparatus having the suction port in the rear part of the apparatus and the discharge port in the front part of the apparatus, the cross-flow fan is arranged in such manner that the rotary shaft thereof is directed in the widthwise direction of the apparatus. The rear guider in the form of a curved surface is provided in the upper part forward of the cross-flow fan within the apparatus, which is continued to the upper diffuser extending to the discharge port. The first and second stabilizers are disposed in series in the widthwise direction of the apparatus in the lower part of the cross-flow fan. Particularly, the first stabilizer is so arranged that an angle a defined between a plane including the axial center of the cross-flow fan and the peak of the first stabilizer, and the horizontal surface is in the range $5° \leq a \leq 40°$.

Further, according to the present invention, the second stabilizer of the above-described apparatus is so arranged that an angle b defined between a plane including the axial center of the cross-flow fan and the peak of the second stabilizer, and the vertical plane is in the range of $0° \leq b \leq 30°$.

A recessed portion formed between the first and second stabilizers of the automobile air conditioning apparatus is a flat surface portion which is even with the surface rearward of the second stabilizer.

In the automobile air conditioning apparatus according to the present invention, it is further so arranged that the cross section of the first stabilizer is generally a right-angled triangle, having the peak as the vertex and the side connected to the discharge port as the hypotenuse of the triangle.

According to one embodiment of the present invention, the suction port is formed at one side of the automobile air conditioning apparatus, and the discharge port is provided at the other side. This automobile air conditioning apparatus is comprised of a first unit of the room air conditioning device which is provided with an evaporator having its upper end inclined toward one end and the cross-flow fan having its rotary shaft directed in the widthwise direction of the apparatus, and a second unit of the room air conditioning device which includes an evaporator and a ventilator. The above-described first unit of the apparatus is provided in the under surface of the ceiling of the automobile with the suction port is located at the side of a dashboard. A discharge port of the second unit is provided in a front grille. The evaporators of the first and second units of the apparatus are placed in an engine room space of the automobile.

As described hereinabove, the air conditioning apparatus for an automobile according to the present invention employs the cross-flow fan, so that the thickness of the apparatus in the heightwise direction can be reduced. Moreover, since there are the first and second stabilizers provided below the cross-flow fan, a compulsory vortex of the air which plays a great role for feeding the air is able to be stably generated. The air conditioning apparatus of the present invention further includes the rear guider and the upper diffuser provided at the surface opposite to the above stabilizers with respect to the cross-flow fan, and the flow of the air can be stabilized with increasing degrees, thereby to prevent the reduction or decrease in the quantity of the air flow and the generation of noises due to the vortex.

The evaporator which has its upper end inclined toward the cross-flow fan can make possible a thinner air conditioning apparatus, and at the same time, it can guide the air flow smoothly to the cross-flow fan. More specifically, the flowing direction of the air into the cross-flow fan is dependent on the compulsory vortex determined by the position of the stabilizers. The compulsory vortex is generated in a circular arc connecting the first, second stabilizers and the axial center of the cross-flow fan, and therefore the air is caused to flow into the cross-flow fan in a direction from below to above the evaporator side of the cross-flow fan. Therefore, the upper end of the evaporator which acts as a resistance to the air flow is positioned close to the side of the cross-flow fan, while the lower end of the evaporator is separated from the cross-flow fan, so that the air flow can be smooth.

According to the air conditioning apparatus of the present invention, the angle a defined by a plane including the axial center of the cross-flow fan and the peak of the first stabilizer, and the horizontal plane is set to be $5° < a < 40°$, or the angle b defined by a plane including the axial center of the cross-flow fan and the peak of the second stabilizer, and the vertical plane is set to be $0° < b < 30°$. Therefore, it becomes possible to generate the compulsory vortex at the most suitable position, and accordingly a sufficient air flow can be secured, with reduction of the noises.

The air conditioning apparatus of the present invention is so arranged that the recessed portion formed between the first and second stabilizers is a flat surface portion which is even with a surface rearward of the second stabilizer, or the first stabilizer has such a cross section as to form generally a right-angled triangle, with the peak as the vertex and the side connected to the discharge port as the hypotenuse of the triangle. Accordingly, the compulsory vortex can be stably and positively generated, whereby a sufficient amount of the air can be provided and the reduction of noises can be effected.

Moreover, in the air conditioning apparatus of the present invention, the first unit of the room air conditioning device provided with the above-mentioned cross-flow fan is mounted in the under surface of the ceiling of the automobile, and the second unit of the room air conditioning device has its discharge port formed in the dash board, so that a continuous air flow is achieved from the dashboard to a rear window through the under surface of the ceiling. Particularly, the whole inside of the automobile can be uniformly and speedily air-conditioned.

BRIEF DESCRIPTION OF THE DRAWINGS

The above and other objects and features of the present invention will become apparent from the following description taken in conjunction with the accompanying drawings, in which.

DESCRIPTION OF THE EMBODIMENT

Figure 1:
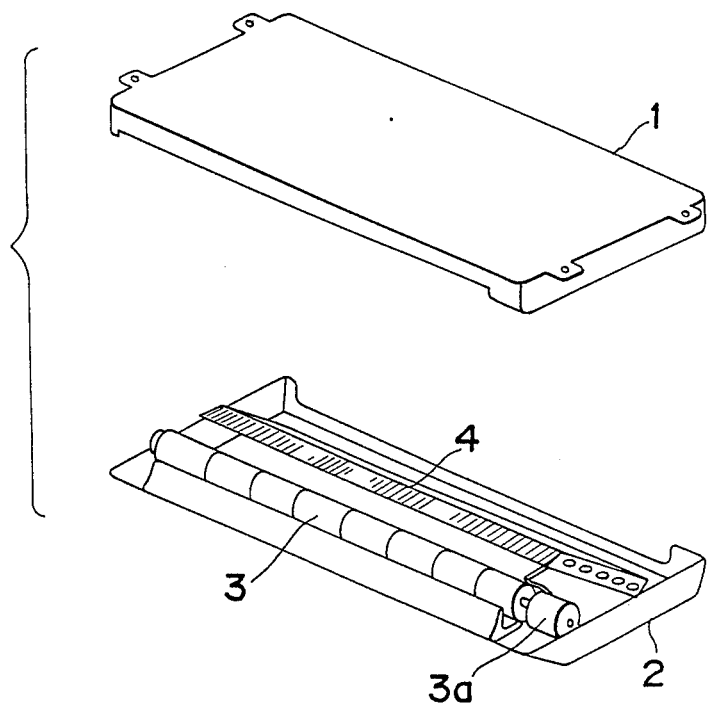
FIG. 1 is an exploded perspective view of an air conditioning apparatus for an automobile according to one preferred embodiment of the present invention.

Before the description of the present invention proceeds, it is to be noted here that like parts are designated by like reference numerals throughout the accompanying drawings.

Referring first to FIG. 1 which is an exploded perspective view, an air conditioning apparatus for use in an automobile of the present invention is comprised of an upper casing 1 provided in the under surface of a ceiling of the automobile or the like, and a lower casing 2. On the lower casing 2, there are provided a cross-flow fan 3 having a rotary shaft thereof arranged in a horizontal direction, and a generally flat evaporator 4 which is constituted by many flat fins and heat-conductive pipes extending perpendicularly through the fins and which has its upper end inclined toward the cross-flow fan 3. The above-described cross-flow fan 3 receives the air from one side along the outer periphery of an impeller, and discharges the air passing through within the impeller out of the other side of the impeller.

Figure 2A:
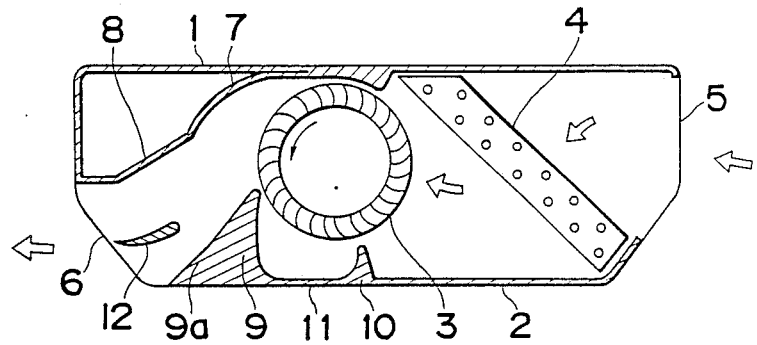
FIG. 2(A) is a side sectional view of the apparatus of FIG. 1.

FIG. 2(a) shows a side sectional view of the air conditioning apparatus of the present invention. Referring to FIG. 2, the air is arranged to be sucked in from a suction port 5 formed in one end of the apparatus, here the rear surface of the apparatus, and blown out from a discharge port 6 in the lower part of the other end, here the front surface of the apparatus. A downstream guide 7 having curved surface is continuously extended in a widthwise direction of the apparatus in the vicinity of the cross-flow fan 3 toward the discharge port 6 of the upper casing 1, with its center of radius of curvature positioned to the side of the cross-flow fan 3. Connected to this guide 7 is an upper diffuser 8 which extends from the to in a direction away from the cross-flow fan 3 generally on the extension line of the guide 7 and thereafter forms a generally horizontal surface extending to the discharge port 6. Furthermore, a first stabilizer 9 and a second stabilizer 10 are provided on the lower casing downstream and upstream, respectively, of a vertical plane passing through the axial center of the cross-flow fan 3. The cross section of the first stabilizer 9 is generally a right-angled triangle having a vertex at the peak of the stabilizer, and the hypotenuse at the side toward the discharge port 6. The surface running from the peak of the first stabilizer 9 to the discharge port 6 constitutes a lower diffuser 9a which forms a discharging section together with the upper diffuser 8. The discharging section is gradually enlarged toward the discharge port 6. The gap between the first stabilizer and the outer periphery of the cross-flow fan 3 is made equal in size to that between the second stabilizer 10 and the outer periphery of the cross-flow fan 3.

There is formed a recessed portion 11 between the first stabilizer 9 and the second stabilizer 10. The recessed portion 11 is hollow with a surface radially outward of a circular arc between the peaks of the first and second stabilizers 9 and 10 around the axial center of the cross-flow fan 3. A vane 12 for changing the direction of the air flow is pivotable around a shaft (now shown) in the discharge port and provided in the widthwise direction of the apparatus.

The structural features of the air conditioning apparatus of the present invention will be described hereinbelow with reference to FIGS. 2 and 3.

Figure 2B:
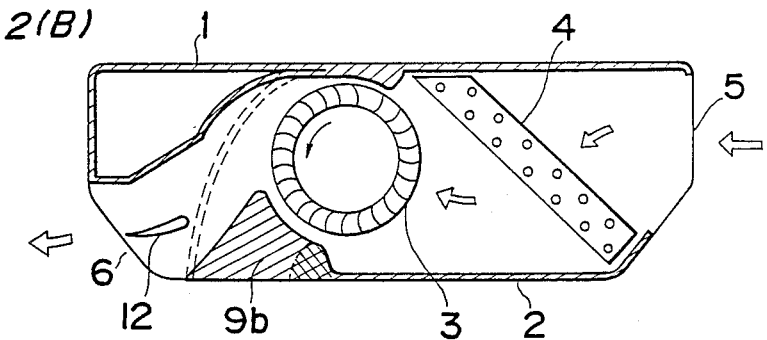
FIGS. 2(B) and 2(C) are side sectional views each showing a comparative example of the structure of the apparatus of FIG. 1.
Figure 2C:
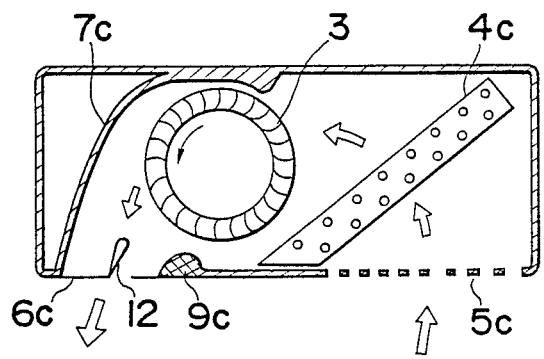
Figure 3:
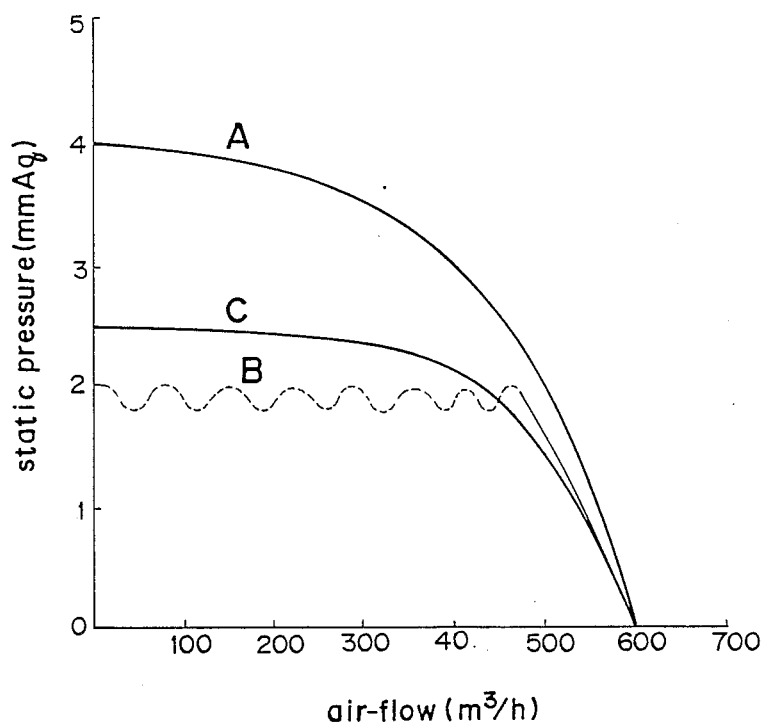
FIG. 3 is a characteristic diagram of the apparatus in each of the structures of FIG. 2.

FIGS. 2(B) and 2(C) are views of comparative examples for explaining of the structure of the apparatus shown in FIG. 2(A), and FIG. 3 is a characteristic diagram of the static pressure and the amount or quantity of the air flow of the apparatus in each of the structures of FIGS. 2(A), 2(B) and 2(C).

In FIG. 2(B), there is only a single stabilizer 9b having a predetermined width in the adjacent portion of the cross-flow fan 3. The apparatus of FIG. 2(B) has the same construction as of FIG. 2(A) except for the above-described stabilizer. In the arrangement of FIG. 2(C), an evaporator 4c is inclined in the reverse direction to that of FIG. 2(A). A suction port 5c and a discharge port 6c are provided in the lower surface of the lower casing 2, and a downstream guide 7c extends to the discharge port 6c. Moreover, there is only a single stabilizer 9c.

Figure 4:
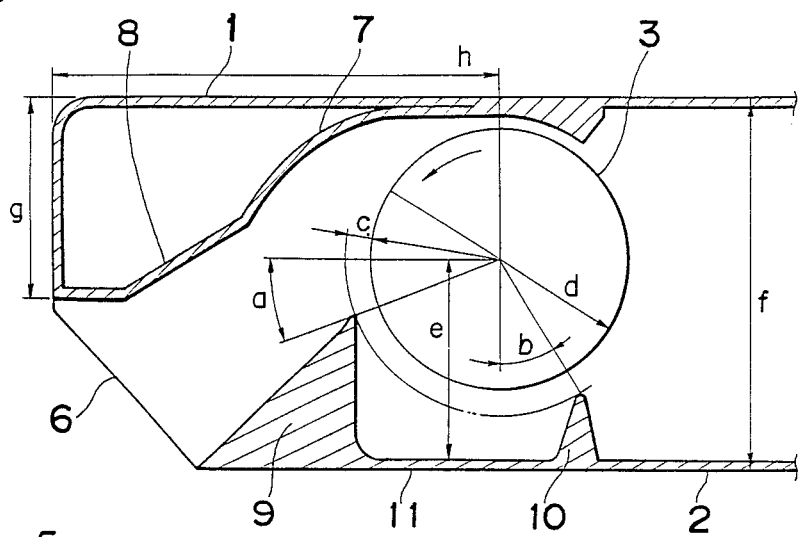
FIG. 4 is a sectional view of an essential portion of the apparatus of the parts of FIG. 1.

Experimental results obtained by the use of the air conditioning apparatus of the present invention will now be described below. FIG. 4 is a cross sectional view of an essential part of the present air conditioning apparatus employed in the experiments.

Referring to FIG. 4, reference a represents an angle defined by a plane including the axial center of the cross-flow fan 3 and the peak of the first stabilizer 9 and a horizontal plane, b representing an angle defined by a plane including the axial center of the cross-flow fan 3 and the peak of the second stabilizer 10 and a vertical plane. A gap c between the outer periphery of the cross-flow fan 3 and the first stabilizer 9 or the second stabilizer 10 is set to be 6–10 mm.

The apparatus of FIG. 4 has a construction that the width dimension of the overall apparatus is 1000 mm, the outer diameter d of the cross-flow fan 3 is 60 mm, the height e from the bottom surface of the lower casing 2 to the axial center of the cross-flow fan 3 is 50 mm, the height f from the bottom surface of the lower casing 2 to the inner lateral surface of the upper casing 1 is 85 mm, the height g of the downstream surface of the upper casing 1 is 50 mm, and the distance h from the downstream end surface of the apparatus to the axial center of the cross-flow fan 3 is 110 mm. The rotating speed N of the cross-flow fan 3 is set to be 3,000 rpm.

Figure 5:
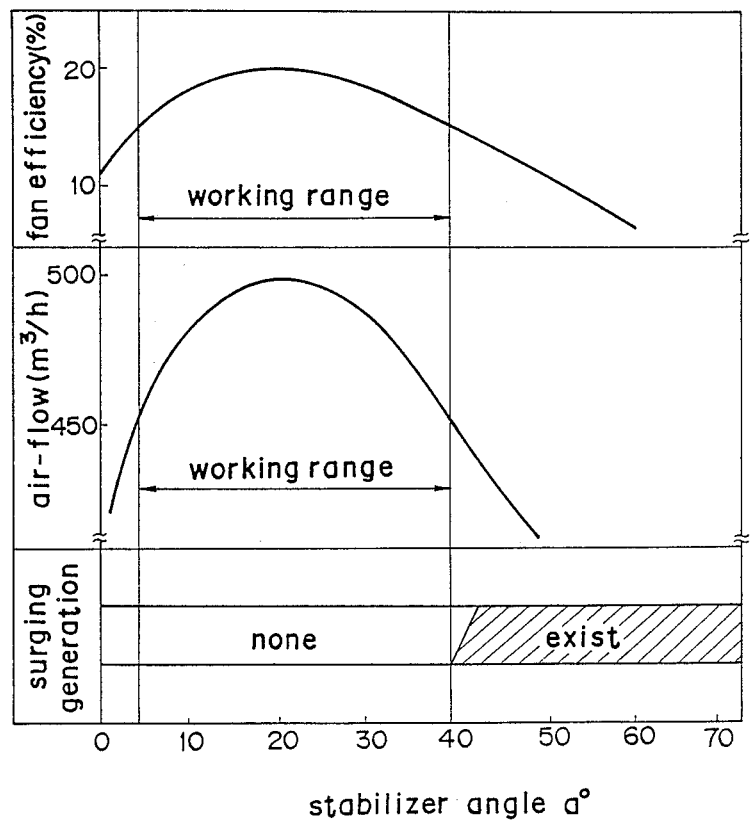
FIGS. 5 and 6 are characteristic diagrams of the apparatus of FIG. 4.

FIG. 5 is a characteristic diagram showing the fan efficiency $\eta_f$(%), the air flow quantity Q (m$^3$/h), and the generation in surgings of the apparatus of FIG. 4 in the case where the angle a is changed within the range $0° < a < 60°$, while the angle b is set to be 20°. It is to be noted here that the angle a is changed while the gap c is kept constant.

The fan efficiency $\eta_f$ referred to above is expressed by the following equation;

$$\eta_f = \frac{\eta_t}{\eta_m}, \quad \eta_t = \frac{P \cdot Q}{367 \cdot V \cdot I}$$

wherein $\eta_t$ is the total efficiency of the fan and the motor, $\eta_m$ is the efficiency of the fan motor, P is the cut-off pressure at the discharge port 6 (mmAq), Q is the air flow quantity (m$^3$/h), V is the input voltage to the fan motor (V), and I is the current inputted to the fan motor (A).

It can be found from FIG. 5 that the angle a is suitable when it is in the range $5° < a < 40°$, in which range there is no generation of surgings, so as to obtain the air flow quantity Q over 450 m$^3$/h.

Figure 6:
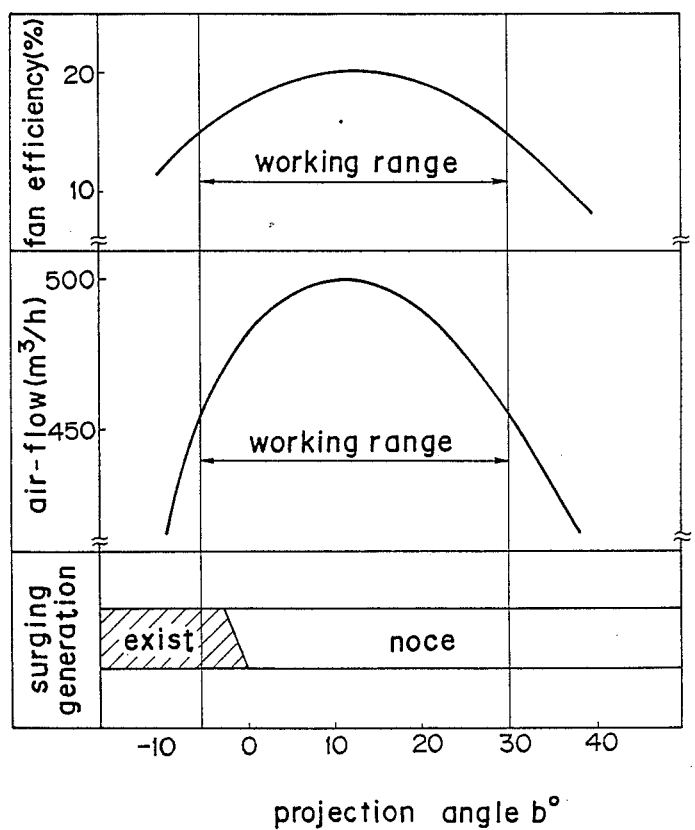

FIG. 6 is a characteristic diagram of the fan efficiency $\eta_f$(%), the air quantity Q (m$^3$/h) and the generation of surgings of the apparatus in the case where the angle b is changed in the range $-10° \leq b \leq 40°$ while the angle a is set to be 20°. It is to be noted that the angle b is changed while the gap c is kept constant.

Accordingly, it is seen from the diagram of FIG. 6 that the angle b is suitable when it is in the range of $0° \leq b \leq 30°$ so as to obtain the air quantity Q over 450 m$^3$/h.

It is particularly suitable for the air conditioning apparatus that the outer diameter d of the cross-flow fan be 40 mm $< d <$ 70 mm, and the height f from the bottom surface of the lower casing 2 to the inner lateral surface of the upper casing 1 be 50 mm $< f <$ 100 mm.

Furthermore, experimental results as to the characteristics of the fan efficiency $\eta_f$, the cut-off voltage P and the air quantity Q when the first stabilizer 9 and the second stabilizer 10 which greatly influence the generation and stabilization of the compulsory vortex, and the recessed portion 11 between the first stabilizer 9 and the second stabilizer 10 are changed in form will be described with reference to FIG. 7.

Each of the characteristics was studied for the cases of respective cross-sections (a)–(d) or the stabilizers and recess shown below the diagram of FIG. 7.

Figure 7:
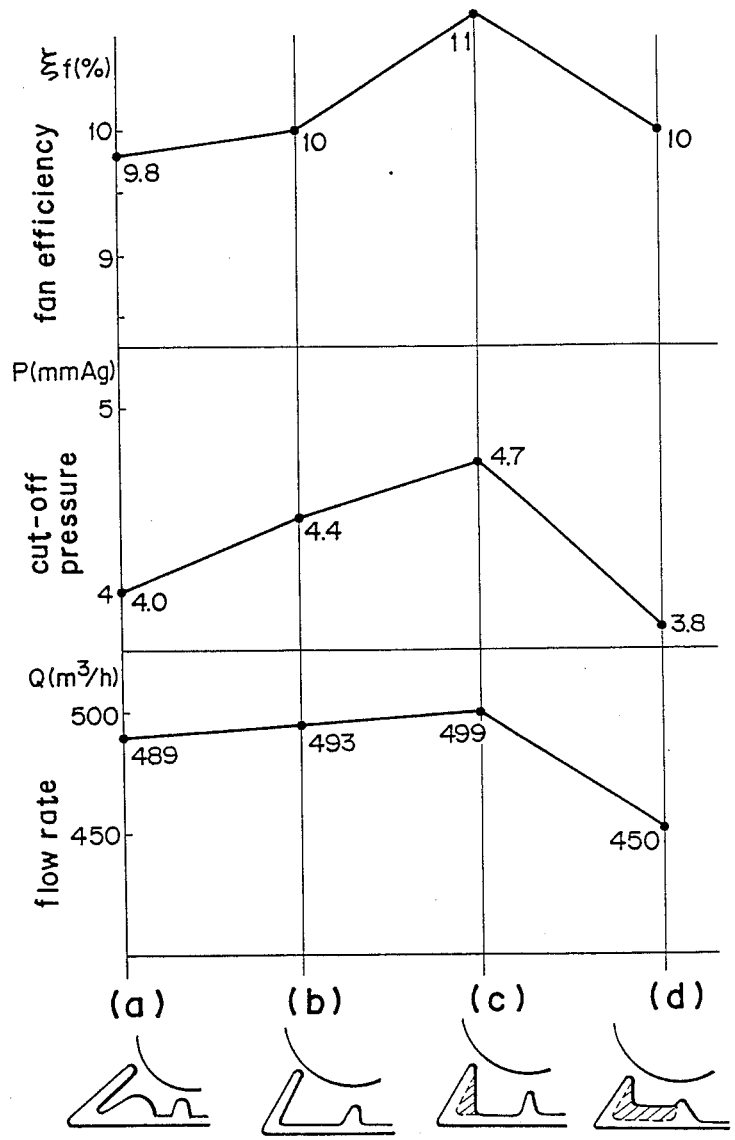
FIG. 7 is a characteristic diagram of the apparatus when stabilizers are modified.

As is seen from FIG. 7, each characteristic is improved when the recessed portion has a flat bottom surface portion even with a surface on the other side of the second stabilizer 10. The characteristics are furthermore improved when the cross section of the first stabilizer 10 is generally a right-angled triangle having a vertex at the peak of the stabilizer and the hypotenuse on the side toward the discharge port of the apparatus.

Figure 8:
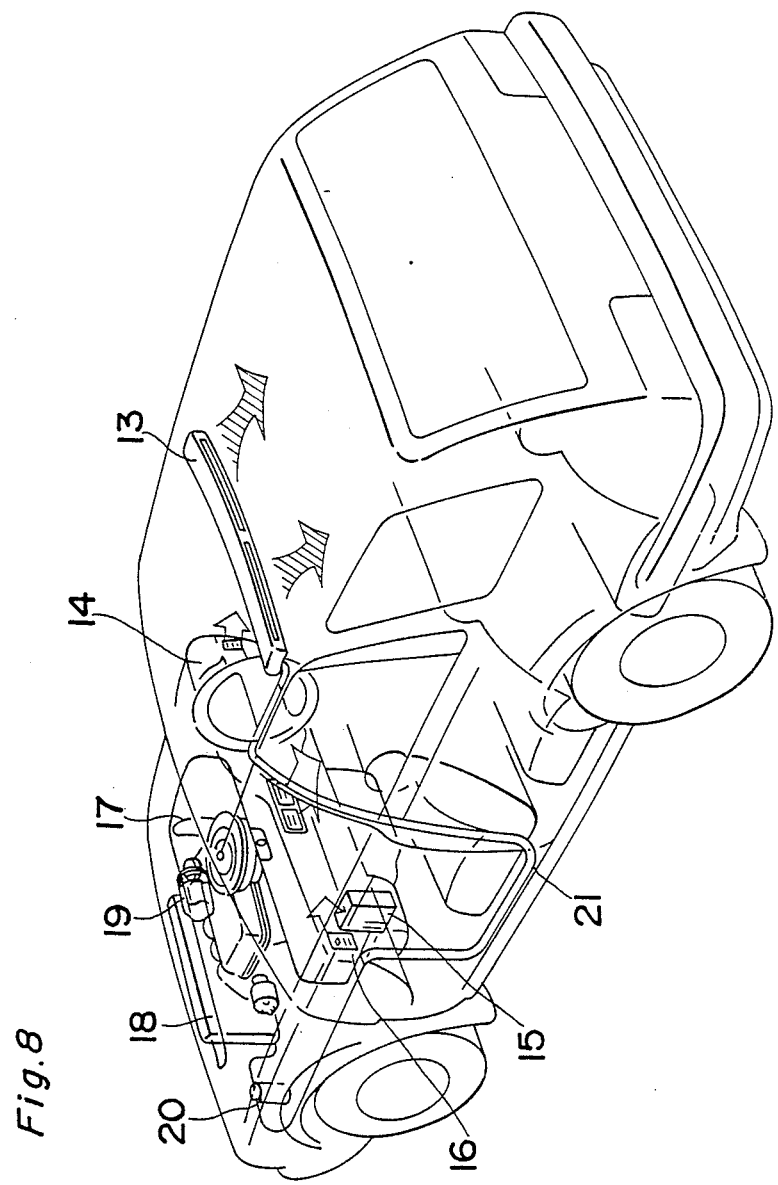
FIG. 8 is a structural diagram showing the apparatus mounted in an automobile.

FIG. 8 shows a structural diagram of the air conditioning apparatus of the present embodiment mounted in an automobile.

In FIG. 8, a first unit of the room air conditioning device 13 provided with a suction port at one side of the apparatus and a discharge port at the other side of the apparatus accommodates therein an evaporator which has an upper end thereof inclined toward the discharge port, and a cross-flow fan having a rotary shaft thereof in the widthwise direction of the apparatus, in this order from the suction port. The first unit 13 is placed in the under surface of the ceiling of the automobile so that the suction port is located toward the dashboard 14 of the automobile. A discharge port 16 of a second unit of the room air conditioning device including an evaporator 15 and a ventilator (not shown) is arranged in the dashboard 14. A capacitor 18, a compressor 19 and a dryer receiver 20 provided in an engine space of the automobile are connected to the evaporators of the first and second units by means of piping 21.

As shown in FIG. 8, the apparatus of the present invention is comprised of the two units, namely, the first and second units of the room air conditioning device, so that the first unit 13 can be utilized for the rear seats of the automobile, and the second unit can be used for the front seats of the automobile, separately from each other. In addition, in the case where the two units are driven simultaneously, the air is able to flow continuously from the dashboard 14 along the under surface of the ceiling to the rear window. Moreover, the inside of the automobile can be cooled at the ceiling portion thereof which has the largest radiation efficiency, thus achieving uniform and speedy air-conditioning of the whole interior of the automobile.

As has been described hereinabove, the air conditioning apparatus for use in an automobile of the present invention employs a cross-flow fan, and accordingly the thickness of the apparatus in the heightwise direction can be reduced. Since the air conditioning apparatus according to the present invention is provided with the first and second stabilizers below the cross-flow fan, the compulsory vortex of the air which is greatly effective for feeding the air can be stabilized. Moreover, the air conditioning apparatus of the present invention is provided with the downstream guide and the upper diffuser at the surface opposite to the stabilizers with respect to the cross-flow fan, so that the air flow is enhancingly stabilized, preventing the reduction of the air flow amount and the generation of noises because of the vortex.

The evaporator of the air conditioning apparatus has its upper end inclined toward the cross-flow fan, and accordingly it helps to reduce the thickness of the apparatus as a whole and smooth the flow of the air into the cross-flow fan. In other words, the flowing direction of the air into the cross-flow fan is influenced by the compulsory vortex determined by the position of the stabilizers. In the meantime, the compulsory vortex is generated within a circular arc connecting the first and second stabilizers and the axial center of the cross-flow fan, and consequently the air flow into the cross-flow fan is directed from the lower part of the cross-flow fan at the side toward the evaporator upwards. Therefore, when the upper end of the evaporator which acts as a resistance to the air flow is positioned, close to the side of the cross-flow fan, with the lower end thereof spaced away from the cross-flow fan, the air flow into the cross-flow fan can be smoothly effected.

According to the present invention, the angle a defined by a plane including the axial center of the cross-flow fan and the peak of the first stabilizer and a horizontal surface is so arranged as to be $5° \leq a \leq 40°$. The angle b defined by a plane including the axial center of the cross-flow fan and the peak of the second stabilizer and a vertical surface is so arranged as to be $0° \leq b \leq 30°$. Therefore, the compulsory vortex of the air can be produced at an optimum position, thereby to secure sufficient air flow amount and to reduce noises.

Still more, according to the present invention, the recessed portion between the first and second stabilizers has a flat bottom surface even with a surface on the other side of the second stabilizer, and the first stabilizer is so shaped that the cross section thereof is generally a right-angled triangle, having a vertex at the peak of the stabilizer and the hypotenuse at the side toward the discharge port of the apparatus. As a result of this, a stable compulsory vortex of the air is positively gained, which is useful to secure the air flow amount and to reduce noises.

In the air conditioning apparatus of the present invention, the first unit of the room air conditioning device provided with the above-described cross-flow fan is mounted in the under surface of the ceiling of the automobile, and the second unit of the device has its discharge port arranged in the front grille of the dashboard. Accordingly, a continuous flow of the air from the dashboard, passing through the under surface of the ceiling, to the rear window of the automobile can be achieved. Therefore, particularly the whole interior of the automobile can be uniformly and promptly air-conditioned.

Although the present invention has been fully described hereinabove by way of example with reference to the accompanying drawings, various changes and modifications will be apparent to those skilled in the art. Therefore, unless otherwise such changes and modifications depart from the scope of the present invention, they should be construed as included therein.

What is claimed is:

1. An air conditioning apparatus for an automobile, comprising:

an upper casing and a lower casing, said casings being assembled together and having a downstream end portion with a discharge port therein and an upstream end portion with an intake port therein;

said lower casing having: a horizontal cross-flow fan rotatably mounted therein between the ends thereof and for rotation around a horizontal axis transversely of the direction from the intake port to the discharge port and for receiving air through a portion of the outer periphery thereof facing the upstream end portion and discharging the air, after it has passed through said fan, out of the other side of the fan, a lower diffuser extending from said fan to the discharge port, a first stabilizer provided below said fan and on the side thereof toward said lower diffuser, a second stabilizer provided below said fan and on the side thereof toward said upstream end portion, said first and second stabilizers defining between them a recessed portion open toward said fan;

said upper casing having a downstream guide having a curved surface having a center of the radius of curvature to the side of said fan and extending from said fan toward said discharge port, and an upper diffuser forming a continuation of said downstream guide and extending on an extension line of said downstream guide to said discharge port and, together with said lower diffuser, defining a discharge passage from said fan to said discharge port which is gradually divergent toward said discharge port.

2. An air conditioning apparatus for an automobile and having a suction port in one end surface of said apparatus and a discharge port in the other end surface thereof, a flat planar evaporator having a lower end toward said suction port and inclined upwardly toward said discharge port to an upper end;

a cross-flow fan mounted in said apparatus and having a rotary shaft thereof extending in a widthwise direction of said apparatus;

a discharge guide having a curved surface in the upper part of said apparatus and extending from said cross-flow fan toward said discharge port;

an upper diffuser forming a continuation of said discharge guide and extending to said discharge port;

a first stabilizer provided inside said apparatus below said cross-flow fan and positioned on the discharge port side of a vertical plane through the axial center of said cross-flow fan; and a second stabilizer provided inside said apparatus below said cross-flow fan and positioned on the suction port side of said vertical plane;

said evaporator, cross-flow fan, said second and first stabilizers, said discharge guide and said upper diffuser being in the recited order from the suction port to the discharge port of said apparatus.

3. An air conditioning apparatus for an automobile and having a suction port in one end surface of said apparatus and a discharge port in the other end surface thereof;

a cross-flow fan mounted in said apparatus and having a rotary shaft thereof extending in a widthwise direction of said apparatus;

a discharge guide having a curved surface in the upper part of said apparatus and extending from said cross-flow fan toward said discharge port;

an upper diffuser forming a continuation of said discharge guide and extending to said discharge port;

a first stabilizer and a second stabilizer each having a cross-sectional shape with a peak extending toward and spaced from said cross-flow fan, and extending in the widthwise direction of said apparatus below said cross-flow fan within said apparatus and spaced from each other in the direction from the discharge port to the suction port, the angle between a plane including the axial center of said cross-flow fan and the peak of said first stabilizer and a horizontal plane is in the range $5° \leq a \leq 40°$.

4. An air conditioning apparatus for an automobile and having a suction port in one end surface of said apparatus and a discharge port in the other end surface thereof;

a cross-flow fan mounted in said apparatus and having a rotary shaft thereof extending in a widthwise direction of said apparatus, a discharge guide having a curved surface in the upper part of said apparatus and extending from said cross-flow fan toward said discharge port;

an upper diffuser forming a continuation of said discharge guide and extending to said discharge port;

a first stabilizer and a second stabilizer each having a cross-sectional shape with a peak extending toward and spaced from said cross-flow fan, and extending in the widthwise direction of said apparatus below said cross-flow fan within said apparatus and spaced from each other in the direction from the discharge port to the suction port, the angle between a plane including the axial center of said cross-flow fan and the peak of said second stabilizer and a vertical plane is in the range $0° \leq b \leq 30°$.

5. An air conditioning apparatus for an automobile having a casing with a suction port in one end surface and a discharge port in the other end surface thereof;

a cross-flow fan mounted in said apparatus and having a rotary shaft thereof extending in a widthwise direction of said apparatus;

a discharge guide having a curved surface in the upper part of said apparatus and extending from said cross-flow fan toward said discharge port;

an upper diffuser forming a continuation of said discharge guide and extending to said discharge port;

a first stabilizer and a second stabilizer each having a cross-sectional shape with a portion extending toward and spaced from said cross-flow fan, and extending in the widthwise direction of said apparatus below said cross-flow fan within said casing and spaced from each other in the direction from the discharge port to the suction port, the stabilizers having a recessed portion defined between them having a flat bottom surface portion which is level with a surface of said casing on the other side of said second stabilizer from said recess toward said suction port.

6. An air conditioning apparatus for an automobile and having a suction port in one end surface of said apparatus and a discharge port in the other end surface thereof;

a cross-flow fan mounted in said apparatus and having a rotary shaft thereof extending in a widthwise direction of said apparatus;

a discharge guide having a curved surface in the upper part of said apparatus and extending from said cross-flow fan toward said discharge port;

an upper diffuser forming a continuation of said discharge guide and extending to said discharge port;

a first stabilizer and a second stabilizer each having a cross-sectional shape with a peak extending toward and spaced from said cross-flow fan, and extending in the widthwise direction of said apparatus below said cross-flow fan within said apparatus and spaced from each other in the direction from the discharge port to the suction port, said first stabilizer having a cross-section which is a generally right-angled triangle and having said peak constituted by a vertex of said triangle and the side toward the discharge port of the apparatus as the hypotenuse of said triangle.

7. An air conditioning apparatus for an automobile and having a suction port in one end surface of said apparatus and a discharge port in the other end surface thereof, a cross-flow fan mounted in said apparatus and having a rotary shaft thereof extending in a widthwise direction of said apparatus;

a discharge guide having a curved surface in the upper part of said apparatus and extending from said cross-flow fan toward said discharge port;

an upper diffuser forming a continuation of said discharge guide and extending to said discharge port;

a first stabilizer provided inside said apparatus below said cross-flow fan; and a second stabilizer provided inside said apparatus below said cross-flow fan and spaced toward the suction port from said first stabilizer and defining with said first stabilizer a recess below said fan.

* * * * *